(12) United States Patent
Ikada

(10) Patent No.: US 8,402,072 B2
(45) Date of Patent: Mar. 19, 2013

(54) PROCESSING APPARATUS FOR CALCULATING AN APPROXIMATE VALUE TO AN ANALYTICAL VALUE WITH A TOLERANCE MAINTAINED AND A METHOD THEREFOR

(75) Inventor: Satoshi Ikada, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 581 days.

(21) Appl. No.: 12/723,037

(22) Filed: Mar. 12, 2010

(65) Prior Publication Data

US 2010/0235415 A1    Sep. 16, 2010

(30) Foreign Application Priority Data

Mar. 12, 2009  (JP) ................................. 2009-060029

(51) Int. Cl.
*G06F 7/00* (2006.01)
*G06F 17/14* (2006.01)
(52) U.S. Cl. .................... 708/200; 708/400
(58) Field of Classification Search .............. 708/200, 708/400
See application file for complete search history.

(56) References Cited

U.S. PATENT DOCUMENTS 6,407,817 B1 * 6/2002 Norita et al. ................. 356/608
7,751,325 B2 * 7/2010 Krishnamurthy et al. ..... 370/233
2005/0204346 A1 * 9/2005 Davies ........................... 717/127
2007/0139251 A1 * 6/2007 Shu .............................. 342/25 R

OTHER PUBLICATIONS

Bingham et al., "Random Projectin in Dimension ality reduction: Applications to Image and Text Data", 2001, 6 pages.*
Gilbert et al., "Surfing Wavelets on Streams: One-pass Summaries for Aproximate Aggregarte Queries", 2001, 10 pages.*

* cited by examiner

*Primary Examiner* — Chuong D Ngo
(74) *Attorney, Agent, or Firm* — Rabin & Berdo, P.C.

(57) ABSTRACT

In an approximation computation apparatus, a location monitor designates, each time the number of data of a received data sequence exceeds an integer l, a starting location of the received data for calculating reduced received-data; a dimensionality reducer dimensionally reduces each data sequence including the received data after the corresponding designated starting location by random projection to generate the reduced received-data; an object selecting controller controls an object in response to a result of monitoring from the location monitor of the number of the received data reaching another integer n, deletes currently-stored object data, selects the reduced received-data after the oldest reduced received-data in the reduced received-data, and substitutes and updates an object data sequence to the selected reduced received-data; and a coefficient approximator calculates an approximate value of a wavelet coefficient on the basis of the object data and a wavelet matrix.

12 Claims, 10 Drawing Sheets

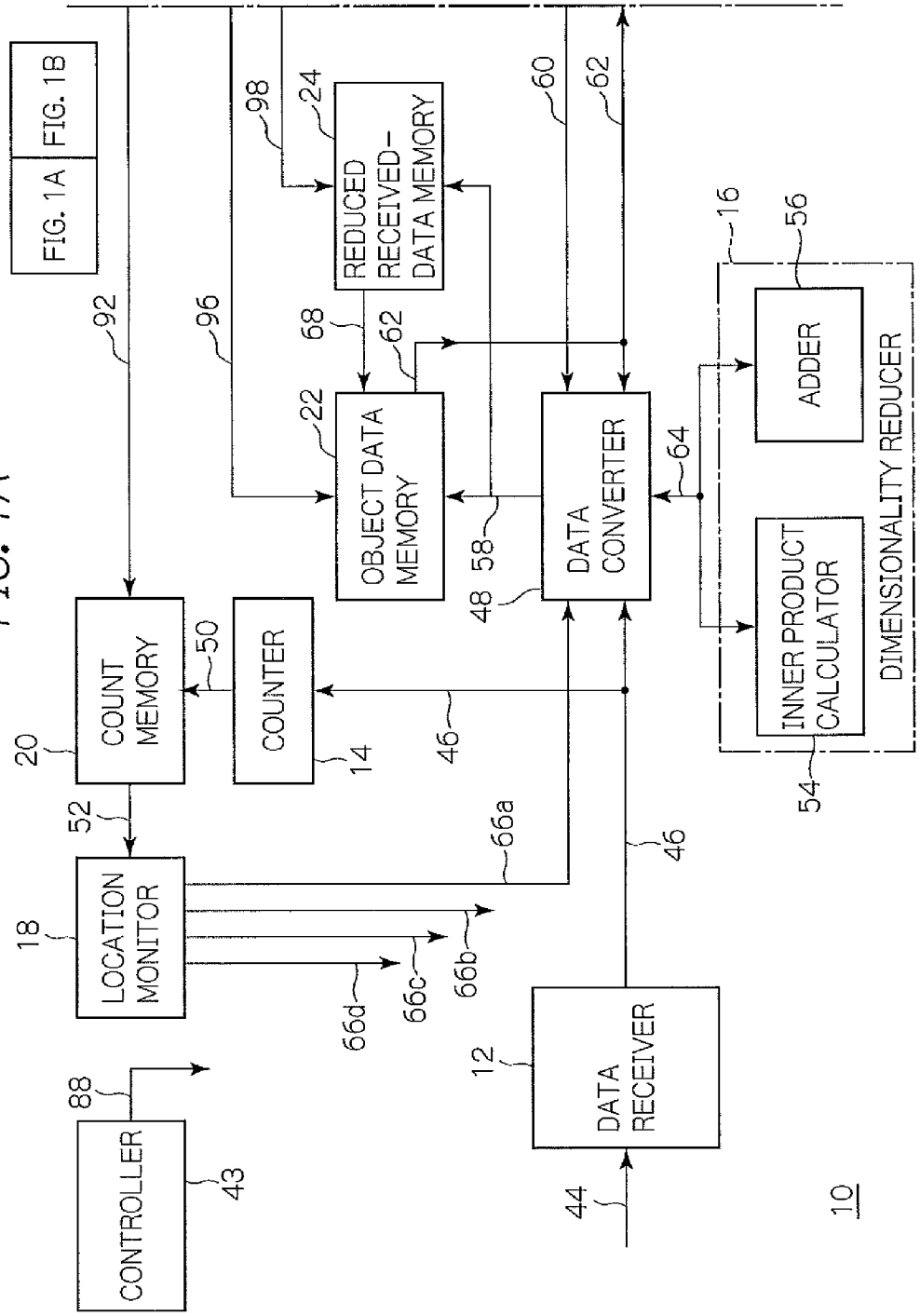

FIG. 3

| 102 | 104 | 106 |
|---|---|---|
| DATA IDENTIFIER | OBJECT DATA | REDUCED RECEIVED-DATA A |
| NUMBER OF DATA | 102432 | 32432 |

| LEVEL | WAVELET MATRIX |
|---|---|
| 1 | $\begin{pmatrix} a_{1,1} & \cdots & a_{1,k} \\ \vdots & \ddots & \vdots \\ a_{i,1} & \cdots & a_{i,k} \end{pmatrix}$ |
| 2 | $\begin{pmatrix} b_{1,1} & \cdots & b_{1,k} \\ \vdots & \ddots & \vdots \\ b_{i/2,1} & \cdots & b_{i/2,k} \end{pmatrix}$ |
| 3 | $\begin{pmatrix} c_{1,1} & \cdots & c_{1,k} \\ \vdots & \ddots & \vdots \\ c_{i/4,1} & \cdots & c_{i/4,k} \end{pmatrix}$ |

FIG. 6A  $\begin{pmatrix} -1 & 1 & 0 & 0 \\ 0 & 0 & 1 & -1 \\ 1 & -1 & 1 & 1 \\ 1 & -1 & -1 & 0 \end{pmatrix}$ ← 114

FIG. 6B  $\begin{pmatrix} 0 & 1 & 1 & -1 \end{pmatrix}$ ← 116

FIG. 6C  $\begin{pmatrix} -1 & 1 & 0 & 0 \\ 0 & 0 & 1 & -1 \\ 1 & -1 & 1 & 1 \\ 1 & -1 & -1 & 0 \\ \hline 0 & 1 & 1 & -1 \end{pmatrix}$ ← 118

| IDENTIFIER | REDUCED RECEIVED-DATA SEQUENCE |
|---|---|
| REDUCED RECEIVED-DATA A | (20.2, 12.8, −2.4, −1.342, 8.532, ⋯) |
| REDUCED RECEIVED-DATA B | (1.23, −12.3, −3.45, −5.03, 3.04, ⋯) |
| REDUCED RECEIVED-DATA C | (−1.57, −15.02, 13.02, 0.23, −4.2, ⋯) |

| LEVEL | WAVELET COEFFICIENT |
|---|---|
| 1 | $w_{1,1}\ w_{1,2}\ w_{1,3}\ \cdots\ w_{1,i}$ |
| 2 | $w_{2,1}\ w_{2,2}\ w_{2,3}\ \cdots\ w_{2,i/2}$ |
| 3 | $w_{3,1}\ w_{3,2}\ w_{3,3}\ \cdots\ w_{3,i/4}$ |

132 / 134 t-TH COMPONENT

PROCESSING APPARATUS FOR CALCULATING AN APPROXIMATE VALUE TO AN ANALYTICAL VALUE WITH A TOLERANCE MAINTAINED AND A METHOD THEREFOR

BACKGROUND OF THE INVENTION

1. Field of the Invention

The present invention relates to an approximation computation apparatus for calculating an approximate value to an analytical value with a predetermined tolerance maintained and a processing method therefor, and more specifically to such an apparatus and a method for calculating an approximate value to an analytical value of consecutively received time serial data.

2. Description of the Background Art

The wavelet analysis has, in recent years, attracted attention as a frequency analysis in consideration of a time domain among the procedures for finding various features from time serial data. This procedure has been applied to many fields such as compression of image and audio data, image processing on medical images, searching for feature-approximating data of audio or music, and analysis and prediction of earthquake shaking with seismic wave data.

Generally, the wavelet transform computation deals with static time serial data. Although time serial data are called static, such data are consecutively supplied in time serial, thus rendering the real-time wavelet transform computation difficult.

Therefore, some procedures were proposed which approximate wavelet coefficients for the wavelet transform to process consecutively-arriving data with the coefficients, thereby reducing the amount of computation.

A first proposal is described in Anna C. Gilbert, et al., "Surfing Wavelets on Streams: One-Pass Summaries for Approximate Aggregate Queries", Proceedings of the 27th VLDB Conference, 2001, pp. 79-88. A second proposal is described in Tatsuya Watanabe, et al., "Dimensionality Reduction by Random Projection", Technical Report of the Institute of Electronics, Information and Communication Engineers, COMP2001-92, 2002, Vol. 101, No. 707, pp. 73-79. A third proposal is described in Dimitris Achlioptas, "Database-Friendly Random Projections", Proceedings PODS, 2001, pp. 13-22.

These proposals are based on the procedure of calculating, in a data domain reduced by using dimensionality reduction called random projection, wavelet coefficients with a certain tolerance, or acceptable range of error, ensured.

However, in the solutions described in the three documents indicated above, whenever data more than a threshold value n arrive or are received, the computation will result in being erroneous so as to exceed a predetermined tolerance, the threshold value n corresponding to the maximum length of data sequence for calculating an approximate value, i.e. wavelet coefficient, to an analytical value with the predetermined tolerance maintained. Thus, those solutions involve a difficulty that a reception of data more than the threshold value gives rise to failure in assuring a tolerable calculation result. Note that the maximum length of a data sequence is also referred to as the maximum number of data guaranteeing the approximation accuracy.

SUMMARY OF THE INVENTION

It is therefore an object of the present invention to provide an approximation computation apparatus capable of calculating, even when data more than a threshold value are received, an approximate value to an analytical value with a predetermined tolerance, and a processing method therefor.

In an approximation computation apparatus in accordance with the present invention, a location monitor designates, each time the number of data of a received data sequence exceeds an integer l, a starting location of the received data for calculating reduced received-data; a dimensionality reducer dimensionally reduces each data sequence including the received data after the corresponding designated starting location by random projection to generate the reduced received-data; an object selecting controller controls an object in response to a result of monitoring from the location monitor of the number of the received data reaching another integer n, deletes currently-stored object data, selects the reduced received-data after the oldest reduced received-data in the reduced received-data, and substitutes and updates an object data sequence to the selected reduced received-data; and a coefficient approximator calculates an approximate value of a wavelet coefficient on the basis of the object data and a wavelet matrix.

Further in accordance with the present invention, an approximation computation apparatus comprises: a data receiver for consecutively receiving data for calculating an approximate value of an analytical value; a counter for counting the received data to produce a count value of the received data; a count memory for storing the count value; a data matrix generator for dimensionally reducing a predetermined data matrix by random projection to generate and output reduced data; a dimensionality reducer for dimensionally reducing a received data sequence through the random projection to generate object data in a process for calculating the approximate value and outputting the object data; a coefficient approximator for calculating the approximate value of the analytical value on a basis of the object data in the process for calculating the approximate value and the reduced data; a location monitor for monitoring whether or not a data location of the received data sequence reaches a predetermined value; and an object selecting controller for switching and controlling a control object related to generation of the object data treated in response to monitoring by the location monitor, wherein the location monitor designates a starting location of the received data for use in generation of a reduced received-data by the monitoring, the reduced received-data being object data generated from the received data sequence each time the number of data of the received data sequence exceeds a predetermined first integer l, the dimensionality reducer generates the object data in response to receiving new data, dimensionally reduces each data sequence including the data having the starting location, for generating the reduced received-data by using the received data sequence, designated by the monitoring by the location monitor through the random projection to generate the reduced received-data, and outputs the object data and the reduced received-data, and the object selecting controller is responsive to the number of data of the received data reaching a second integer n larger than the first integer l, selects anyone of the plurality of reduced received-data as the object data for wavelet transform to thereby control the coefficient approximator to calculate the approximate value of the analytical value.

Still further in accordance with the present invention, an approximation computation apparatus for setting a wavelet coefficient as an analytical value to calculate an approximate value of the wavelet coefficient comprises: a random matrix supplier for receiving a request to generate a random matrix, generating random numbers for an arbitrary number of groups each including a predetermined first integer number k of the random numbers, setting a predetermined first integer n to a maximum number of rows to generate the random matrix of n rows and k columns from the generated random numbers, and storing and outputting the generated random matrix; an output switcher for selecting at least one arbitrary row from the random matrix of n rows and k columns to switch a destination; a data receiver for consecutively receiving data for calculating an approximate value of the wavelet coefficient; a counter for counting a number of data of received data and separately counting the newly received data in parallel each time the count exceeds a predetermined second integer l; a count memory for storing the numbers of the data of a plurality of types of the counted data; a dimensionality reducer for receiving the data sequence having a length equal to or more than one and set as an object for calculating the approximate value of the wavelet coefficient and the stored random matrix to dimensionally reduce the data sequence with the random matrix through random projection, generating object data for wavelet transform with the data sequence having its number of data fixed to a second number k, and outputting the generated object data; an object data memory for storing the object data for wavelet transform supplied from the dimensionality reducer; a data matrix generator for receiving wavelet data set on a basis of a predetermined wavelet data matrix and the random matrix to dimensionally reduce the wavelet data through the random projection, generating a wavelet reduced-data sequence, and outputting the generated wavelet reduced-data sequence; a reduced data memory for storing the wavelet reduced-data sequence as a wavelet matrix at an associated wavelet level; a coefficient approximator for using the object data for wavelet transform from the object data memory and the wavelet matrix from the reduced data memory to calculate the approximate value of the wavelet coefficient; a coefficient memory for storing the calculated approximate value of each wavelet coefficient; a location monitor for monitoring whether or not a data location of the received data sequence reaches a predetermined value; a reduced received-data memory for storing the reduced data generated by the dimensionality reducer as reduced received-data; and an object selecting controller for switching and controlling a control object so as to update a treated object of the object data in response to monitoring by the location monitor, wherein the location monitor designates a starting location of the received data for use in generation of reduced received-data by the monitoring, the reduced received-data being an object data generated from the received data sequence each time the number of data counted by the counter exceeds the second integer l, the dimensionality reducer generates the object data in response to receiving new data, dimensionally reduces each data sequence including the data having the starting location, for generating the reduced received-data by using the received data sequence, designated by the monitoring by the location monitor through the random projection to generate the reduced received-data, and outputs the object data and the reduced received-data, and the object selecting controller is responsive to the number of the received data reaching the first integer n, selects the reduced received-data after the oldest reduced received-data stored in the reduced received-data memory, deletes the object data for wavelet transform currently stored in the object data memory, supplies the reduced received-data in the reduced received-data memory as new object data to the object data memory, and substitutes the object data to update.

According to the present invention, therefore, an approximate value arithmetic apparatus makes use of an inner product calculator and an adder in a dimensionality reducer to generate object data for wavelet transform for data received by a data receiver, determines by a location monitor whether or not the number of data of a received data sequence exceeds an integer l, finds, when this determination is true, reduced received-data each time the number of data of the received data sequence exceeds the integer l, controls by an object selecting controller in response to determination that the number of data of the received data sequence reaches an integer n larger than the integer l, a coefficient approximator to newly receive any one of the plurality of reduced received-data as object data in a process, and calculates an approximate value of an analytical value, for example, a wavelet coefficient on the basis of the object data and a wavelet matrix as the reduced data by the coefficient approximator. Thus, even when the number of the received data is equal to or larger than the threshold value n, the approximate value of the analytical value can be found with a predetermined tolerance.

BRIEF DESCRIPTION OF THE DRAWINGS

The objects and features of the present invention will become more apparent from consideration of the following detailed description taken in conjunction with the accompanying drawings in which:

FIGS. 1A and 1B are, when combined as shown in FIG. 1, forms a schematic block diagram showing the configuration of an approximate value arithmetic apparatus to which applied is an approximation computation apparatus in accordance with the present invention;

FIG. 3 shows an exemplary content stored in the count memory shown in FIG. 1A;

FIG. 5 shows an exemplary content stored in the reduced data memory shown in FIG. 1B;

FIG. 6A shows an exemplary random matrix stored in the random matrix memory shown in FIG. 1B;

FIG. 6B shows an exemplary random matrix newly generated by the random matrix generator shown in FIG. 1B;

FIG. 6C shows how to add a row to the random matrix stored in the random matrix memory shown in FIG. 1B;

FIG. 8 shows an exemplary content stored in the reduced received-data memory shown in FIG. 1B, and also conceptually shows how to monitor the starting location of parallel calculations;

FIG. 9 shows an exemplary content stored in the coefficient memory shown in FIG. 1B;

DESCRIPTION OF THE PREFERRED EMBODIMENTS

Figure 1B:
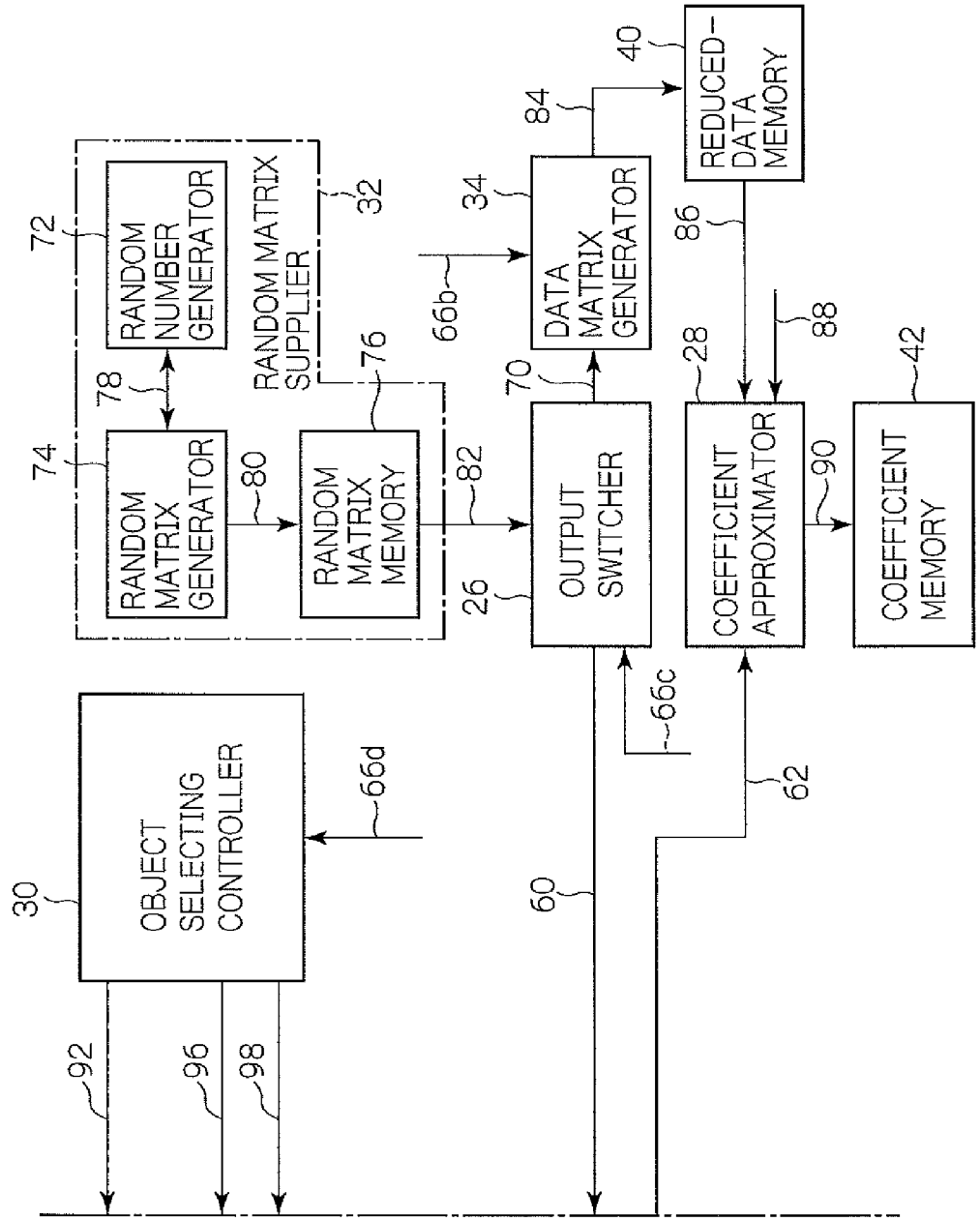

Reference will be made to accompanying drawings to describe in detail an approximation computation apparatus in accordance with a preferred embodiment of the present invention. With reference to FIGS. 1A and 1B, the approximation computation apparatus in accordance with the instant illustrative embodiment is implemented as an approximate value arithmetic apparatus 10. Generally, in the approximate value arithmetic apparatus 10, a dimensionality reducer 16 renders an inner product calculator 54 and an adder 56 therein operative on data 44 received by a data receiver 12 to generate object data 58 for wavelet transform, and a location monitor 18 determines whether or not the size, e.g. number, of data 52 of received data exceeds a natural number, or positive integer, l to designate the starting position from which reduced received-data 58 are to be found each time the number of data 52 of the received data reaches the integer l, and controls an object selecting controller 30, when it is determined that a counter adapted to count object data 58 for wavelet transform includes a count equal to an integer n larger than the integer l, to store in an object data memory 22 any one of the plurality of reduced received-data as object data 62 for wavelet processing, wherein a coefficient approximator 28 uses the object data 62 stored in the object data memory 22 and a wavelet reduced matrix 86 stored in a reduced data memory 40 to calculate an approximate value of a wavelet coefficient. Thereby, even when the number of the received data exceeds a threshold value n, an approximate value of an analytical value can be found with a predetermined tolerance.

It is to be noted that the wavelet coefficient in this embodiment is an "analytical value" referred to in the present application. It is also to be noted that the approximate value arithmetic apparatus 10 in this embodiment is an apparatus to which an approximate wavelet coefficient computation apparatus in accordance with the present invention is applied to calculate an approximate value of wavelet coefficient with a predetermined tolerance.

In addition to the data receiver 12, dimensionality reducer 16, location monitor 18, object selecting controller 30 and coefficient approximator 28 described above, the approximate value arithmetic apparatus 10 includes, as shown in FIGS. 1A and 1B, a counter 14, a count memory 20, an object data memory 22, a reduced received-data memory 24, an output switcher 26, a random matrix supplier 32, a data matrix generator 34, a reduced data memory 40, a coefficient memory 42 and a controller 43, which are interconnected as illustrated.

The data receiver 12, FIG. 1A, has a function to receive time serial data 44. The data receiver 12 may properly include components suited to the specifications of data 44 to be received. The data receiver 12 receives data 44, and supplies the received data 46 to the counter 14 and a data converter 48. Signals and data are designated with reference numerals of connections on which they are conveyed.

The counter 14, FIG. 1A, is operative in response to the data 46 received from the data receiver 12 to cause a count memory 20 to increment all its counts by one. The counter 14 increments a count for use in processing the object data 58 for wavelet transform, and also calculates the data 46 received after a starting position designated by the location monitor 18 respectively in parallel. The word "count" or "count value" generally refers to two sorts of count value. These features will be further described later.

The count memory 20 is adapted to store the data, or counts, which the counter 14 increments, and has storage areas, or capacity, for storing therein plural sorts of resultant counts associated with the data. Count values stored are classified into two; one is a count for use in processing object data for wavelet transform, which may hereinafter sometimes be referred to simply as a count for object data, and the other is a count for use in processing each of the reduced received-data, i.e. count for reduced data. The count memory 20 is adapted to deliver the counts 52 stored therein to the location monitor 18. Further details will be described later.

The location monitor 18 fetches counts 50 stored in the count memory 20 as counts 52. Specifically, the location monitor 18 is adapted to obtain a count for the object data 58 for wavelet transform and counts resultant from counting the respective reduced received-data to determine whether or not the count for the object data 58 reaches a value equal to a multiple of a predetermined integer l and another predetermined integer n to thereby supply a data converter 48 and an object selecting controller 30 with control instructions and specific information. Further, the location monitor 18 is operative in response to the counts resultant from counting the object data 58 for wavelet transform and the counts resultant from counting the respective reduced received-data being incremented by one to feed an output switcher 26 and a data matrix generator 34 with control instructions and specific information. When the count for the object data 58 reaches a value equal to a multiple of the predetermined integer l, the data converter 48 is fed with a control signal 66a to thereby be instructed to produce in parallel data sequences for wavelet transform following those data. When the count for the object data 58 reaches a value equal to the predetermined integer n, the object selecting controller 30 is fed with a control signal 66d to thereby update the object data for wavelet transform with the reduced received-data. The location monitor 18 may be adapted to additionally include the overall control over the entire approximate value arithmetic apparatus 10.

The dimensionality reducer 16, as shown in FIG. 1A, includes the data converter 48, the inner product calculator 54, and the adder 56. The dimensionality reducer 16 has a processing function to use a random matrix 82 stored in the random matrix memory 76 to allow the inner product calculator 54 to dimensionally reduce the data into data having a length of k to thereby attain the random projection function. Thus, the data sequence having a length of k in the received data is a dimensionally reduced-data sequence for wavelet transform. The computational operation will be described later on.

The location monitor 18, FIG. 1A, has a function to receive the count value 52 resultant from counting the object data 58 for wavelet transform, and to be responsive to the count value equal to a multiple of the integer l to newly designate the data as a starting position of the received-data sequence to be dimensionally reduced, the dimensionality reducer 16 thus being informed accordingly.

The data converter 48 supplies the object data memory 22 with object data 58 for wavelet transform which the dimensionality reducer 12 reduces. The data converter 48 is responsive to the data receiver receiving data to in turn obtain from the received data 46 an object data sequence for wavelet transform and reduced received-data. When a count for use in processing the object data sequence for wavelet transform is equal to the value n, the object selecting controller 30 selects one of the reduced received-data as a new object to be analyzed, which will be a data sequence for wavelet transform.

Data following the start position sequentially designated by the location monitor 18 are input to the dimensionality reducer 16 in parallel to be produced as reduced received-data. The data converter 48 will resultantly produce a plurality of reduced received-data which are dimensionally reduced with the received data sequence shifted every l pieces. The data converter 48, in turn, feeds the object data memory 22 with the data sequence 58 for wavelet transform thus obtained, and the reduced received-data memory 24 with other reduced received-data.

The data converter 48 has a function to convert or modify the format of the supplied data according to the design specifications of the user so as to be able to calculate the inner product of a matrix. For example, the data converter 48 rearranges the received data in the order in which they are received and forms an (l×m) matrix having the values of the data. To the data converter 48, the components of the random matrix selected by the output switcher 26, FIG. 1B, are supplied as the data 60. The data converter 48 is supplied with the object data 62 for wavelet transform stored in the object data memory 22, the object data 62 also being supplied to the coefficient approximator 28, FIG. 1B.

The inner product calculator 54 has a function to calculate the inner product of the inputted matrix and output the resultant inner product. The inner product calculator 54 receives the (m×k) random matrix and the inputted received-data supplied in the form of (l×m) matrix through the data converter 48 as the data 64, and calculates the inner product on the basis of the data 64.

The inner product calculator 54 uses an (m×k) random matrix to calculate the inner product of a matrix. This calculation corresponds to the random projection, and is commutative. More specifically, the inner product may be obtained by calculating either the inner product of an (l×m) data sequence with the random matrix or the inner product of the transposed matrix $R^T$ of the random matrix with the transposed matrix (m×l) of the inputted received-data sequence. Therefore, the data converter 48 converts the data on the basis of the order of the calculation or whether or not the transposition is made according to the design specifications of the inner product of the user. The inner product calculator 54 supplies the result 64 of the calculation of the inner product to the data converter 48.

The adder 56 has an arithmetic function to add, between inputted two data series, the values of the components of the first data series to the values of the corresponding components of the second data series. The adder 56 adds the data series 64 supplied from the data converter 48, i.e. received data sequence, to the data series for wavelet transform obtained by random projection to obtain the dimensionally reduced data for the received data sequence 46.

The operation of the adder 56 will be specifically described. For example, the first data series has a length of 5, and includes (−3.8, 2, 4.3, 2.4, 3). The second data series includes (1.3, −1.2, −2.8, −2.4, 1.2), the same length of 5. In this case of setting, the adder 56 calculates (−3.8+1.3, 2+(−1.2), 4.3+(−2.8), 2.4+(−2.4), 3+1.2)=(2.5, 0.8, 1.5, 0, 4.2). The adder 56 supplies the data series 64 as the result of addition to the data converter 48. The data converter 48 outputs the calculated data series 64 as the object data for wavelet transform and the reduced received-data 58 to the object data memory 22.

The object data memory 22 is a storage for storing the data 58 for wavelet transform calculated by the data converter 48, the data 58 being an object reduced-data sequence to be wavelet-transformed. The object data memory 22 is adapted to provide the data converter 48 and the coefficient approximator 28, FIG. 1B, with the data sequence 62, object data to be wavelet transformed, thus stored.

Each time the count for the object data 58 for wavelet transform is equal to a multiple of the predetermined integer l, the reduced received-data memory 24 is supplied with the reduced, new received-data 58 which the dimensionality reducer calculates from the received-data 46. The reduced received-data memory 24 stores the reduced received-data 58 thus supplied. The system is adapted to provide the reduced received-data, when initially stored, with an identifier such as a time stamp in order to define in which temporal order the data are stored.

The output switcher 26, FIG. 1B, is adapted to acquire or select a random matrix data 68 supplied from the random matrix supplier 32, and supplies the random matrix data thus obtained or selected to the destinations which are selected in response to the control signal 66c from the location monitor 18. The output switcher 26 may feed the data converter 48, FIG. 1A, as a destination with the data 60, and the data matrix generator 34, FIG. 1B, with the components of the random matrix as data 70. The output switcher 26 may be adapted to select a matrix over plural lines so as to obtain matrix data.

Particularly, in an application in which the output switcher 16 shares in function with the dimensionality reducer 16, the output switcher 26 may perform dimensionality reduction through random projection so as to select the (t+1)-th row newly added in the (t+1)×k random matrix stored in the random matrix memory 76 and to supply the row to the data converter 48. The obtained data are supplied to the data matrix generator 34 through the output switcher 26.

In the above described embodiment, the output switcher 26 has the function to select the designated arbitrary matrix data, i.e. random matrix. However, the random matrix supplier 32 may also be adapted to have a function to select the random matrix. The components of the random matrix supplier 32 will be further described later on.

The random matrix supplier 32, as shown in FIG. 1B, includes a random number generator 72, a random matrix generator 74, and the random matrix memory 76. The random number generator 72 has a function to produce a plurality (k) of random numbers in a set. Random numbers can be generated by arbitrary algorithm, specifically Mersenne algorithm. The random number generator 72 outputs data 78 including a set of k random numbers thus generated to the random matrix generator 74.

The random matrix generator 74 has a function to receive a set of k random numbers generated by the random number generator 72 a plurality (l) of times to align the l sets of random numbers to form a random matrix consisting of the of l rows×k columns. The random matrix generator 74 in this embodiment is responsive to a random matrix generation request signal, not shown, from the data converter 48 to supply the random number generator 72 with a signal for requesting the start of generation of random numbers.

Specifically, the random matrix generator 74 aligns the k supplied random numbers into the l rows to thereby generate a random matrix. The random matrix generator 74 generates a random matrix having (l×k) random matrix components from the supplied random numbers, and stores the generated random matrix 80 to the random matrix memory 76.

The random matrix memory 76 is a data storage for storing data of a random matrix the random matrix generator 74 generates. The random matrix memory 76 may be adapted to have the function of selecting output data by selecting designated arbitrary matrix data 82 from the stored random matrix data as described above to deliver the data to the output switcher 26.

The data matrix generator 34 has a function to generate a sequence of values for wavelet transform having an arbitrary length with respect to each level. The data matrix generator 34 dimensionally reduces a predetermined wavelet data matrix. It is then provided as a random matrix 70 selected by the output switcher 26. The data matrix generator 34 provides the dimensionality reducer 16 with the predetermined wavelet data matrix and its random matrix 70 thus supplied to thereby obtain the data into which the wavelet matrix data are dimensionally reduced. The reduced data for wavelet may sometimes be referred to simply as reduced data. The data matrix generator 34 stores the reduced data 84 thus generated into the reduced data memory 40.

The dimensionality reducer 16 and the data matrix generator 34, when implemented in the form of software, may contain components in the form of shared subroutines of computation and processing performed on the basis of the object received-data and random matrix supplied to return the result therefrom to the data converter 48 or data matrix generator 34 that have instructed the computation or processing.

The reduced data memory 40 is adapted to store therein the reduced data for wavelet data matrix of the respective levels generated by the data matrix generator 34. The reduced data memory 40 stores the supplied reduced data 84, and outputs the stored reduced-data of the respective levels as the reduced data 86 to the coefficient approximator 28.

The coefficient approximator 28 has a function to use the data sequence 62 for wavelet transform stored in the object data memory 22, FIG. 1A, and the reduced data 86 for wavelet transform stored in the reduced data memory 40 to calculate an approximate value of the wavelet coefficient as the analytical value. With the instant embodiment, the data sequence 62 is data for analysis resultant from selecting one of the plural reduced received-data which has its starting position closest to the top of the data. The coefficient approximator 28 calculates and generates the approximate value in response to a control signal 88 supplied at a predetermined timing. The timing is defined as, for example, when the data are supplied under the read-out state from both the object data memory 22 and the reduced data memory 44 after the data converter 48 and the data matrix generator 34 have completed the processing after data reception. The coefficient approximator 28 outputs the calculated approximate value 90 of the wavelet coefficient to the coefficient memory 42. The calculation will be described later in detail.

The object selecting controller 30, FIG. 1B, has a function to be responsive to the control signal 66d produced from the location monitor 18 when the count for object data for wavelet transform stored in the count memory 20 reaches the predetermined integer n during the location monitor 18 monitoring to select the oldest reduced received-data in the reduced received-data memory 24 to supply the reduced received-data 68 left to the object data memory 22, and replace the current data sequence for wavelet transform therewith to thereby set new reduced received-data 68, thereby the current data sequence being updated to the next data sequence for wavelet transform.

The reduced received-data 68 for which the new data are replaced are deleted from the reduced received-data memory 24. The count stored in the count memory 20 for the object data for wavelet transform are replaced with the count stored in association with the oldest reduced received-data thus selected. The count stored in association with the oldest reduced received-data will be deleted from the count memory 20.

The object selecting controller 30 is responsive to the supplied control signal 66d to control the selection and deletion of the oldest reduced received-data, the replacement of the data sequence for wavelet transform, the replacement of a count for object data for wavelet transform, and the deletion in connection with the oldest reduced received-data. These controls correspond to the control signals 92, 96 and 98. The control signals 92, 96, and 98 are switched and supplied to the count memory 20, the object data memory 22, and the reduced received-data memory 24, respectively, as destinations. The operation will be further described later.

The controller 43, FIG. 1A, has a function to control the components of the approximate value arithmetic apparatus 10. Particularly, the controller 43 supplies the control signal 88 to the coefficient approximator 28, which in turn calculates the approximate value of the coefficient in response to the supplied control signal 88. That function of the controller 43 may be implemented by the object selecting controller 390. The control signal 88 is generated and supplied when the data are supplied under the read-out state from both the object data memory 22 and the reduced data memory 44 after the data converter 48 and the data matrix generator 34 have completed the processing after data reception. The controller 43 controls the write-in/read-out operation and addressing over the above-described memories.

Now, the wavelet data refer to a data sequence or series having discrete wavelets as the component values of its rows. For example, the Haar wavelet data having a length of 8 at the level 1 are four series (−1, 1, 0, 0, 0, 0, 0, 0), (0, 0, −1, 1, 0, 0, 0, 0), (0, 0, 0, 0, −1, 1, 0, 0), and (0, 0, 0, 0, 0, 0, −1, 1). The wavelet matrix is data represented in the form of matrix of wavelet data. For instance, the Haar wavelet data having a length of 8 at the level 1 as above are a matrix of four row and eight columns, i.e. (−1, 1, 0, 0, 0, 0, 0, 0), (0, 0, −1, 1, 0, 0, 0, 0), (0, 0, 0, 0, −1, 1, 0, 0), and (0, 0, 0, 0, 0, 0, −1, 1). This may be represented as a whole by the expression (1), $$\begin{pmatrix} -1 & 1 & 0 & 0 & 0 & 0 & 0 & 0 \\ 0 & 0 & -1 & 1 & 0 & 0 & 0 & 0 \\ 0 & 0 & 0 & 0 & -1 & 1 & 0 & 0 \\ 0 & 0 & 0 & 0 & 0 & 0 & -1 & 1 \end{pmatrix} \quad (1)$$

The wavelet reduced data refer to a data sequence dimensionally reduced having its length k into which each of the generated wavelet data is dimensionally reduced through random projection.

The counter 14, the dimensionality reducer 16, the location monitor 18, the output switcher 26, the coefficient approximator 28, the object selecting controller 30, the random matrix supplier 32, the data matrix generator 34, and the controller 43 can be implemented by hardware such as circuit devices attaining their functions, or by software operative on a processor system such as a microcomputer or a CPU (Central Processing Unit). The software includes program sequences operable in parallel. The software may be recorded on a recording medium.

The illustrative embodiment is thus depicted and described as configured by separate functional blocks. It is however to be noted that such a depiction and a description do not restrict those components to an implementation only in the form of hardware but may partially or entirely be implemented by software, namely, by a computer, or processor system, which has a computer program installed and functions, when executing the computer program, as part of, or the entirety of, the embodiment. In this connection, the word "circuit" may be understood not only as hardware, such as an electronics circuit, but also as a function that may be implemented by software installed and executed on a computer.

Additionally, a memory device such as a RAM (Random Access Memory) or a flash memory can be applied to the count memory 20, the object data memory 22, the reduced received-data memory 24, the random matrix memory 76, the reduced data memory 40, and the coefficient memory 42. Further in addition, some of the components arranged for outputting information may include an appropriate interface therefor.

Figure 2A:
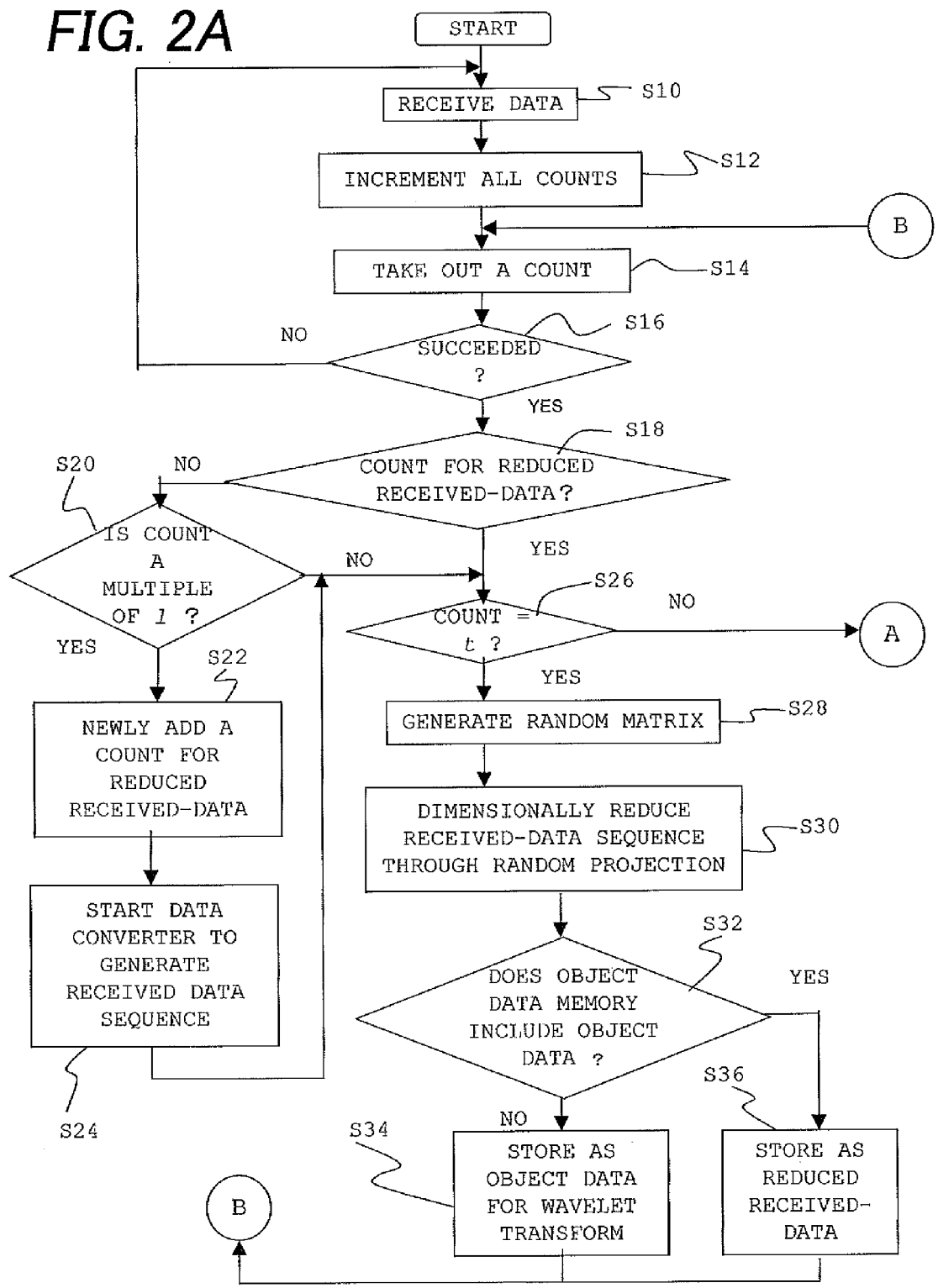
FIGS. 2A and 2B are a flow chart useful for understanding an operating sequence of the approximate value arithmetic apparatus shown in FIGS. 1A and 1B.

Next, with reference to FIGS. 2A and 2B, the operational sequence of the approximate value arithmetic apparatus 10 will be described in accordance with the present embodiment.

When starting a generation of a data sequence for wavelet transform, the user may set in advance various conditions for the respective components of the approximate value arithmetic apparatus 10. First, for the random matrix generator 74, the number k of columns and the maximum of rows n of the random matrix are set. The number k of columns and the maximum of rows n are respective integers. Second, for the location monitor 18, the integer l is set, which is a value for defining the starting location of parallel calculations. Third, for the object selecting controller 30, the integer n is set, which is a value defined on the basis of an error amount for the result from the calculation of a wavelet coefficient described later. The integer n, for example, as disclosed in the above-indicated Tatsuya Watanabe, et al., is designated to a value equal to or less than the maximum number of data guaranteeing the approximation accuracy of the random projection. In addition, the integers k, n, and l satisfy the relationship of $k \leq l < n$. The approximate value arithmetic apparatus 10 is set so as to satisfy this relationship.

The data receiver 12 receives the data 44 supplied from the exterior of the apparatus in the step for receiving data S10. The data receiver 12 outputs the data 46 to the data converter 48 of the dimensionality reducer 16. The data 46 are an object for calculating the approximate value of the wavelet coefficient. The counter 14 responds to the data 46 to increment all counts stored in the count memory 20 by one, namely counts up, in a counting step S12.

The count memory 20 has, as shown in FIG. 3, its storage fields of, for example, data identifier 102 and count value 108 in the lower line which are adapted for storing a count 104 for object data for wavelet transform and a count 106 for reduced received-data together with an identifier. As an example of count 106 for each reduced received-data, the identifier "reduced received-data" and its one count value only are depicted.

The location monitor 18 sequentially monitors a count for object data for wavelet transform stored in the count memory 20 and counts for respective reduced received-data. The monitoring proceeds to in such a fashion that a count for object data for wavelet transform is first monitored and then remaining counts for reduced received-data in sequence. It is preferable to monitor the counts for reduced received-data in the order of counts being stored in the count memory 20.

Initially, the location monitor 18 takes out one of the counts stored in the count memory 20, in step S14. If there is no count to be taken out due to all counts having been taken out (NO, the first decision step S16), then the control proceeds to the data reception step S10. Otherwise (YES, Step S16), the control is transferred to the second decision step S18, in which it is determined whether or not the count value is a count for object data for wavelet transform. If that is the case (YES, the third decision step S20), then it is determined in step S20 whether or not the count is a multiple of the predetermined integer l. If the step S20 shows YES, then the control will be transferred to data reception sequence generation step S22. Otherwise (NO) in the step 20, namely, the count is not a multiple of the predetermined integer l, then the control will proceed to the determination step S26 for determining the number of received data.

In step S18, if it is determined that the count value is a count for reduced received-data, then the control will proceed to the determination step S26.

In the data reception sequence generation step, the count memory 20 is newly provided with a count for reduced received-data together with an identifier, the count being set to "1" with the illustrative embodiment. The location monitor 18 then delivers the control signal 66a to the data converter 48 to allow the data converter 48 to produce a data sequence to be temporarily stored in time serial from the received data 46. That means the received data 46 will be set to the top of the received data sequence, to which the data following thereto will be coupled. After the processing, the control will advance to the fourth decision step S26.

In the fourth decision step S26, it is determined whether or not the count is equal to an integer t. If that is true (YES) the control proceeds to step S28. Otherwise (NO), namely, when the count exceeds or does not reach the integer t, the control will proceed to the fifth decision step S38, FIG. 2B, via a connector A.

In the fifth decision step for the number of data received, if the count exceeds the integer t (YES), the control progresses to a step S40 of producing a different random matrix for that reception. When the count does not reach the value t, the control will proceed to the data coupling step S60 of connecting the data to the data sequence existing in the data converter 48. In the data coupling step, the data received is coupled to the last position of the received data sequence. Thereafter, the control will return to the step S20 of monitoring of counts, FIG. 2A, via a connector B.

Returning to FIG. 2A, the fourth decision step will be described about when the count is equal to the integer t. In this case, the location monitor 18 supplies the data converter 48 with that count, the identifier therefor and control signal 66a, and requests for generating a random matrix if the random matrix memory 76 is void of random matrix, in step S28. If the memory 76 includes a random matrix, the control will skip the step S28 of generating a random matrix to proceed to the step S30.

A random matrix will be generated in the following steps. In this embodiment, the data converter 48 receives a count and its identifier together with the control signal 66a transferred from the location monitor 18, and supplies a generation request signal, not shown, to the random matrix generator 74 to request for a generation of the (t×k) random matrix. The random matrix generator 74 receives a request from the data converter 48, and supplies the random number generator 72 with a signal 78 requesting for generating t groups of random numbers with k random numbers set as a unit group.

In the random number generation step, the random number generator 72 generates random numbers as a unit of random numbers which are equal in number to the predetermined integer k. The random number generator 72 outputs the generated random number sequence (kt) 78 to the random matrix generator 74.

The random matrix generator 74 causes the random number generator 72 to repetitively proceed to the generation of a unit (k) of random numbers a plurality (e.g. t) of times designated by the random matrix generator 74. From the t sets of random numbers thus generated, a (t×k) random matrix will be produced.

The requirements of the random matrix are various. For example, as disclosed in the above-indicated Dimitris Achlioptas, the component $r_{i,j}$ of the random matrix is preferably a random number satisfying the condition of an expression (2):

$$r_{i,j} = \sqrt{3} \times \begin{cases} +1 & \text{with probability } 1/6, \\ 0 & \text{with probability } 2/3, \\ -1 & \text{with probability } 1/6 \end{cases} \quad (2)$$

Next, the random matrix generator 74 stores the generated random matrix 80 into the random matrix memory 76 in the step for storing random matrix. The output switcher 26 in turn selects one or more arbitrary rows from the random matrix stored in the random matrix memory 76, and outputs the random matrix 82 having one or more selected rows to a destination in the steps for selecting random matrix. The random matrix 82 may be selected in a read-out operation from the random matrix memory 76. The output switcher 26 switches the destination to the data converter 48 or the data matrix generator 34 in response to the control signal 66c to output the random matrix 82 having an arbitrary number of rows.

The data converter 48 takes out the first through t-th rows from a random matrix stored in the random matrix memory 76 and delivers them to the dimensionality reducer 16, which in turn dimensionally reduces them through the random projection to thereby generate the data sequence, in the step S30 of generating dimensionally reduced data.

This processing step will be described in more detail. It is assumed that the dimensionality reducer 16 currently has received a data sequence $d=(d_1, d_2, \ldots, d_t)$ having a length of t from the data converter 48. The dimensionality reducer 16 delivers the received data sequence 46 as the object data sequence d for calculating the approximate value of the wavelet coefficient and the (t×k) random matrix $R^k$ (60) of the first through t-th rows supplied from the random matrix stored in the random matrix memory 76 via the output switcher 26 as the data 64 to the inner product calculator 54.

The random matrix in this embodiment is generated, in the step S22, as a t×k random matrix on the basis of the number t of the data by the random matrix generator 74, which is not restrictive. For example, the j×k random matrix may be generated in advance under the condition of the arbitrary number rows j>t to be stored in the random matrix memory 76. Then, the first to t-th rows of the stored random matrix may be taken out, supplied to the data converter 48, and inputted to the inner product calculator 54. In the random matrix read out from the random matrix memory 76, in this case, a matrix having one or more rows can be optionally read out, or selected by the output switcher 26.

The inner product calculator 54 uses the matrix data 64 representing the data sequence 46 and the random matrix 60 to calculate the inner product of the matrix. In general, an inner product is calculated out by the inner product calculator 54 as the inner product $d^r = d \cdot R^k_t$ of the inputted data sequence d and the random matrix $R^k_t$. The superscript "r" of the inner product $d^r$ represents that the data has been processed by the random projection. The inner product calculator 54 will dimensionally reduce the data sequence d by the random projection. The inner product calculator 54 supplies the data $d^r$ obtained by calculating an inner product of a matrix to the data converter 48.

In the step S32, if the object data memory 22 has no data stored (YES), then the data converter 48 stores the generated data $d^r$ into the object data memory 22 as object data for wavelet processing, in step S34. After the storage, the control will return to the step S14 of monitoring count value. By contrast, in the step S32, if it is determined that the object data memory 22 includes no data stored for wavelet processing (NO), then the data $d^r$ are stored into the reduced received-data memory together with its identifier received from the location monitor 18 as reduced received-data. From the top of the received data sequence, t pieces of data will be deleted in the step S36.

Meanwhile, for example, as described in the above-described Tatsuya Watanabe, et al., by further multiplying a coefficient suitable for each configured random matrix, the random projection may more accurately be proceeded to.

The data for wavelet transform will be updated in the fashion which will be described with reference to FIG. 2B about when the count is larger than the integer t but smaller than the integer n. Briefly describing the operational sequence, in the data converter 48, if the identifier received from the location monitor 18 is representative of the object data for wavelet transform, takes out from the object data memory the object data 62 for wavelet transform. If the identifier indicates either one of the reduced received-data, then the converter 48 takes out from the reduced received-data memory 24 the reduced received data associated with the same identifier as the former.

The data 46 newly received by the data receiver 12 and the random matrix 60 taken out from the random matrix memory by the output switcher is inputted to the inner product calculator 54, which in turn calculates the inner product thereof and converts the newly received data into the column data fixed to the plurality (k) of pieces, which are inputted into the adder 56 together with the object data for wavelet transform just taken out or the reduced received-data to add their corresponding components to each other in the matrixes to output the resulting added data sequence to the object data memory 22, when they are the object data for wavelet transform, and to the reduced received-data memory 24, when they are the reduced received-data, to thereby update these memories.

In the update processing, when new received data are arrived, and the count monitored by the location monitor is equal to or exceeds the value of t+1, data for wavelet transform obtained by the dimensionality reduction or the reduced received-data are updated.

Further details will be described. When the count received from the location monitor is equal to or exceeds the value of t+1, the data converter 48 proceeds to the step S26 of updating the received data.

In the process of updating the object data for wavelet transform or the reduced received-data $d^r$ when new data arrive, the counter 14 increments by one the count held in the count memory 20. The resultant count value thus incremented is represented by s.

Next, the data converter 48 asks the random matrix generator 74 for producing an (s×k) random matrix in step S40. The random matrix generator 74 confirms the random matrix already stored in the random matrix memory 76. If the random matrix memory has an (m×k) random matrix already stored therein and m>s, then no generation is performed. By contrast, if m<s, then the random matrix generator 74 causes the random number generator to produce a series of k random numbers a plurality (s−m) of times to thereby produce a series of (s−m)×k random numbers, which will in turn be added to the position below the m-th row of (m×k) random matrix to thereby form an (s×k) random matrix, which will be stored into the random matrix memory 76. That is shown by the (s×k) matrix generation step S26. How to generate the random matrix in that step may be the same as the generation of random matrix as described above. The data converter 48 request the output switcher 26 for returning the s-th row of the random matrix stored in the random matrix memory.

Now, as a specific example, the addition process for a row in the random matrix will be described with reference to FIGS. 6A, 6B, and 6C. A random matrix 114 shown in FIG. 6A is a 4×4 matrix already stored in the random matrix memory 76. A matrix 116 shown in FIG. 6B is a newly generated 1×4 random matrix. As shown in FIG. 6C, a row-added 5×4 random matrix 118 is newly generated by adding the newly generated random matrix 114 surrounded by a dot and dash line 120 to the row position below the fourth, or lowest, row of the random matrix 116.

The integer s is a count transferred from the location monitor 18 to the data converter. The output switcher 26 the s-th row of the random matrix stored in the random matrix memory 76 to deliver it to the data converter 48.

In the subroutine SUB1 of generating object data for wavelet transform and reduced received-data, the data converter 48 provides the value of the received data $d_s$ (46) and the random matrix $R^k_s$ (60) supplied from the output switcher 28 to the inner product calculator 54 as data 64. The inner product calculator 54 uses those data 64 thus entered to calculate the matrix inner product, which is the calculation of the inner product of the s-th row. If the identifier of the count is for the count for use in processing wavelet transform (NO, the step S42), then the dimensionality reducer 16 reads out the newest object data $d^r$ for wavelet transform stored in the object data memory 22 to store the object data $d^r$ thus readout and the data $d^r_s$ obtained by the inner product calculator 54 to the adder 56.

In the step S42, it is determined that the identifier of the count is for the reduced received-data (YES), then the dimensionality reducer 16 reads out the reduced received data $d^r$ stored in the object data memory 22 with that identifier to store the object data $d^r$ thus readout and the data $d^r_s$ obtained by the inner product calculator 54 to the adder 56.

The adder 56 in turn adds the components of the data $d^r$ inputted to the values of the components of the data $d^r_s$ obtained. The adder 56 feeds the data 64 resultant from the addition to the data converter 48. In the step S42, if the original data $d^r$ is the object data for wavelet transform (NO), then the data converter 48 stores the data 64 resultant from the calculation by the adder 56 into the object data memory 22 as the updated data of the object data for wavelet transform. If the original data $d^r$ is the reduced received-data (YES), then the data converter 48 stores the data 64 into the object data memory 22 as the updated data of the reduced received-data.

The data converter 48 repeats these procedures each time the data receiver 12 receives the data 44, and supplies the data $d^r$ (58) found by the dimensionality reducer 16 as updated data to the object data memory 22, in the step for dimensionality reduction. The object data memory 22 stores the object data $d^r$ (58) in the step of storing object data.

Next, the operation of generating the wavelet reduced-data subroutine SUB2 will be described which dimensionally reduces the data matrix in the wavelet through the random projection by the data matrix generator 34 to thereby generate wavelet reduced data. Generally, the reduced data are generated as a reduced-data sequence in the wavelet by calculating the inner product of the matrix of the wavelet data matrix and the random matrix stored in the random matrix memory 76 in the procedure of generating a data matrix in wavelet.

Figure 4:
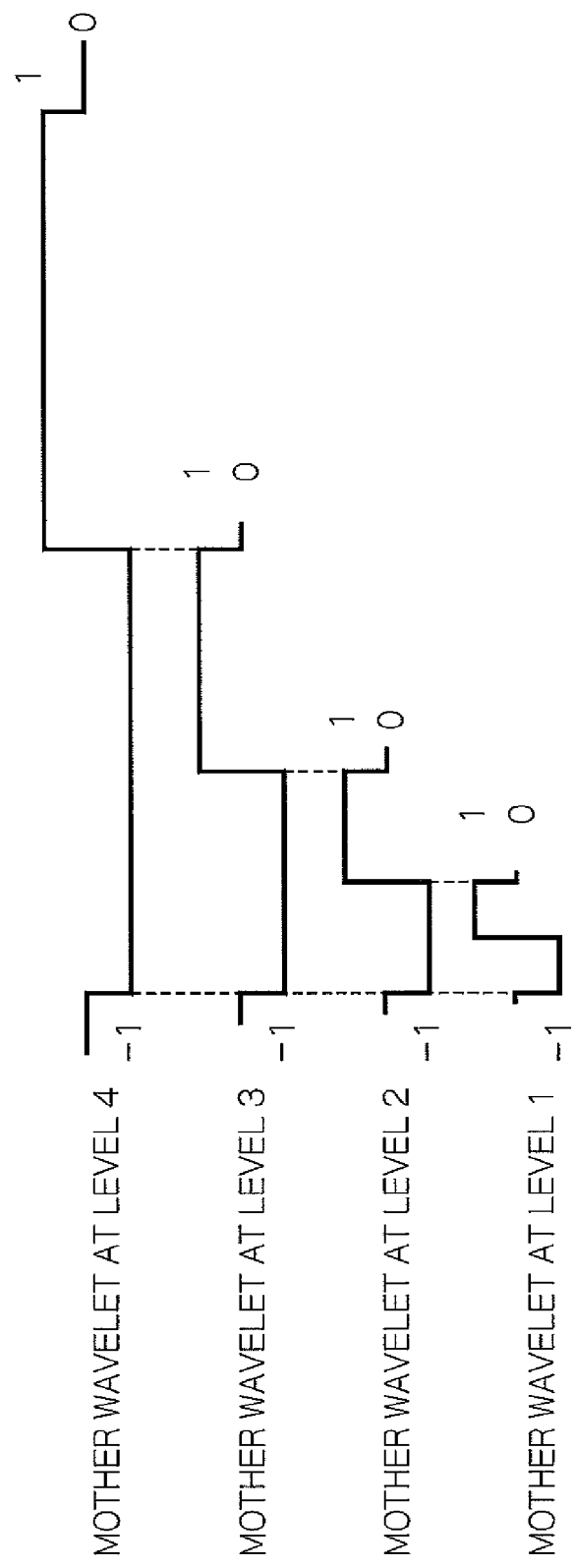
FIG. 4 shows Haar mother wavelets on the levels in the data matrix generator shown in FIG. 1B.

Further in detail, this generating procedure will be described. The data matrix generator 34 in the wavelet generates the data matrix for wavelet transform having an arbitrary length. As a specific example, Haar mother wavelets at levels 1 to 4 are shown in FIG. 4. The data matrix in the wavelet is simply referred to as a wavelet data matrix. For example, as shown in FIG. 4, in the case of Haar mother wavelet or basic wavelet, the waveform for use in a reference scale is represented by the periods or sections at the levels "−1" and "1".

For example, a wavelet matrix at level 1 having a length of 8 is, as described earlier, (−1, 1, 0, 0, 0, 0, 0, 0), (0, 0, −1, 1, 0, 0, 0, 0), (0, 0, 0, 0, −1, 1, 0, 0), and (0, 0, 0, 0, 0, 0, −1, 1). Therefore, the above-described wavelet matrix at level 1 having a length of 8 may be put into a single matrix like the expression (1) set forth above.

The data matrix generator 34 has a function to calculate an inner product similarly to the inner product calculator 54. The data matrix generator 34, similarly to the object data for wavelet transform, inputs the random matrix stored in the random matrix memory 76 and the wavelet matrix to the inner product calculator function and dimensionally reduces them through random projection to thereby generate the reduced data for the wavelet matrix. That is the step of producing reduced data.

The data matrix generator 34 stores the reduced data 84 of the wavelet matrix generated to the reduced data memory 40 level by level with the original wavelet level made explicit. That is the step of storing wavelet reduced data.

The reduced data memory 40, as shown in FIG. 5, has a data structure including a level 110 and a wavelet matrix 112. The reduced data memory 40 stores the resulting matrix calculated at a corresponding level into the field of the wavelet matrix 112.

Now, the row at wavelet level 1 has a subscript i, the row at level 2 has a subscript i/2, and the row at level 3 has a subscript i/4. Those subscripts represent, as seen from FIG. 4, that the wavelet width is doubled as the level of wavelet rises, and the wavelet is slid by two pieces of data on the time axis.

Next, in the normal procedure, the approximate value of the wavelet coefficient would be calculated. However, as described in above-indicated Anna C. Gilbert, et al., when the number of the received data exceeds a certain threshold value n, an error in the approximate value of the calculated wavelet coefficient is increased. Therefore, for the number of data exceeding the value n, the approximate value computation would be difficult due to increasing error.

With the instant embodiment, therefore, the dimensionality reducer 16 is adapted to cause the location monitor 18 to produce the reduced received-data dimensionally reduced through random projection from a received data sequence each time the count for object data for wavelet transform becomes any multiple of the value l, thus minimizing the error with a predetermined tolerance.

In this illustrative embodiment, the data converter 46 produces through random projection reduced received-data to which the data sequence having the start positions of the received data sequence shifted one by one by the location monitor 18 are dimensionally reduced, and then the object selecting controller 30 sets, when the count resultant from counting the object data for wavelet transform reaches the integer n, the reduced received-data stored in the reduced received-data memory 24 to new data for wavelet transform. That makes it possible to continuously compute, even when the number of the received data becomes equal to or exceeds the threshold n, the approximate value of the wavelet coefficient with a predetermined tolerance.

In order to perform these processes, the operational control compares and decides, as described above, the count value for the object data for wavelet transform with the comparative conditions (steps S16, S20 and S24). First, each time the counted data is equal to a multiple of the predetermined integer l, the data converter 48 is instructed to produce a received data sequence to temporarily be stored in time serial as a data sequence, in the step of monitoring starting location of parallel calculations. Then, in the count memory 20, there is newly provided a count for reduced received-data together with an identifier to set the count to one, in step S22. When the count for reduced received-data reaches the value t, the received data sequence is dimensionally reduced through random projection in the subroutines SUB1, SUB2 and SUB1 of generating object data, wavelet reduced data and reduced received-data, respectively. Then, the dimensionally reduced-data sequence is outputted and stored as the reduced received-data 58.

Then, when the count for wavelet transform reaches the predetermined number n of the data, the object selecting controller 30 conducts an object control to select the reduced received-data after the oldest reduced received-data, deletes the currently stored object data for wavelet transform, supplies the selected reduced received-data as new object data, and replaces the object data for updating. Additionally, the object selecting controller 30 may select any one of the plurality of reduced received-data as object data for wavelet transform to update the object data in the step of switching the object of wavelet calculation. In this embodiment, these processing steps are added prior to calculating the approximate value of the wavelet coefficient. These added steps will be described more in detail.

In the procedure of generating reduced received-data, at first, the location monitor 18 monitors the count for reduced received-data resulting from counting by the counter 14 and stored in the count memory 20.

When this count reaches the predetermined integer l, the location monitor 18 supplies the data converter 48 with that count and its identifier, and the control signal 66a. The data converter 48, in response to the control signal 66a received, dimensionally reduces the received data sequence 46 to generate the reduced received-data (subroutine SUB3). Then, the t pieces of the received data sequence from the starting location are deleted.

Figure 7:
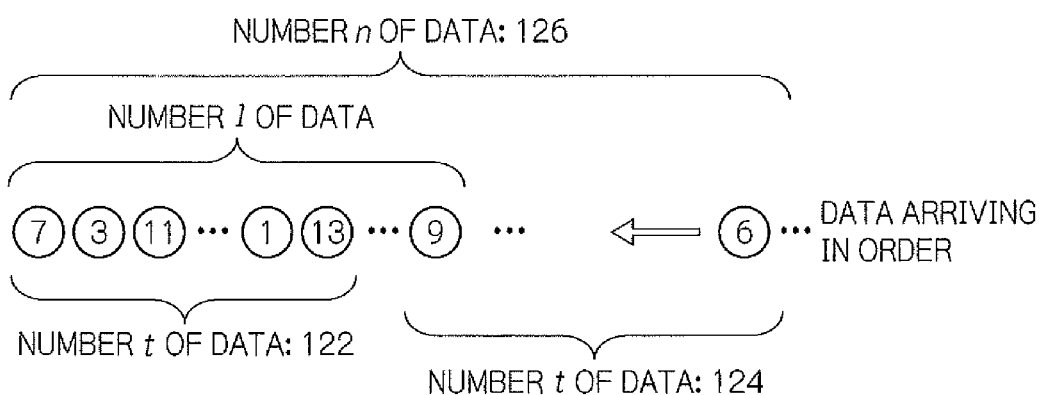
FIG. 7 conceptually shows how to start calculation in parallel in the location monitor shown in FIG. 1B.

Specifically, for the case of the predetermined integer t, FIG. 7 schematically shows the concept of the process for monitoring the starting location of the parallel calculations. As seen from FIG. 7, when having received a plurality (t−1) of data up to No. "1", the data converter 48 dimensionally reduces a received data sequence (7, 3, 11, . . . , 1).

Next, when having received a plurality (t) of data, the dimensionality reducer 16 dimensionally reduces the received data sequence (7, 3, 11, . . . , 1, 13) 122 by the random matrix through random projection. The dimensionally reduced data are the reduced received-data for use in processing for the approximate value of the wavelet coefficient.

Then, the location monitor 18 receives a count 52 for object data for wavelet transform, and determines, when the count value 52 is equal to one, for example, whether or not the number of data is a multiple of the predetermined integer l. If that is the case, then the count memory 20 newly sets a count for reduced received-data together with an appropriate identifier, with that count set to one.

The location monitor 18 monitors all those counts for reduced received-data which are started to be counted in parallel. For example, the location monitor 18 additionally arranges a new field for storing a count for reduced received-data, as shown with the reduced received-data A in FIG. 3, and monitors that count. Each time the count for the object data for wavelet transform is equal to a multiple of the predetermined integer l, the addition of a new count described above will be repeated.

The data converter 48 is then supplied with the control signal 66a designating a location as the starting location of the data for calculating the reduced received-data by the location monitor 18. That causes the data converter 48 starts coupling the received data sequence from the l-th incoming data "9" shown in FIG. 7. The data reception is repeated several times.

Then, when the location monitor 18 determines that the count for reduced received-data stored in the count memory 20 together with its identifier becomes equal to the value t+1, that count for reduced received-data and its identifier are transferred to the data converter 48 together with the control signal 66a instructing the production of reduced received-data. Thus, the data converter 48 dimensionally reduces the received data sequence (9, . . . , 6) having its starting location corresponding to the l-th incoming data "9" already presented by the random matrix through random projection. The reduced received-data are stored in the reduced received-data memory 24 together with the identifier transferred from the location monitor 18.

In this way, the approximate value arithmetic apparatus 10 dimensionally reduces, each time having received the plurality (t) of data, the supplied data sequence 46 by the random matrix through random projection to store the reduced data into the reduced received-data memory 24. As shown in FIG. 7, the number n, 126, of the data is the value of the threshold value for keeping the approximate value of the analytical value within the predetermined tolerance.

The reduced received-data memory 24 is provided with, as shown in FIG. 8, the field for storing a reduced received-data 130 corresponding to an identifier 128. The reduced received-data 130 associated with the identifiers "reduced received-data A", "reduced received-data B" and "reduced received-data C" represent the respective results from newly processing the data sequence in parallel through random projection each time the number of data reaches l. FIG. 8 represents that, in addition to generation of the object data in the wavelet process, three pieces of reduced received-data are currently generated in parallel.

In this illustrative embodiment, FIG. 8 exemplarily shows the reduced received-data "A", "B" and "C" recorded in the order of A, B and C only for the purpose of illustration. The invention would not be restricted to this specific example. Identifiers, such as recording time, may be attached such that the order of recording the data are rendered explicit.

Next, the calculation of the approximate value of the wavelet coefficient will be described. The coefficient approximator 28, in response to the control signal 88 supplied when the object data 62 and the reduced data 86 are supplied with the number of data t larger than the integer l but smaller than the integer n, substitutes the object data 62 and the reduced data 86 into an expression (3):

$$w = \|a\| \cdot \|b\| \left( 1 - \frac{\left\| \frac{a}{\|a\|} - \frac{b}{\|b\|} \right\|^2}{2} \right) \quad (3)$$

to thereby calculate the approximate value of each wavelet coefficient (step S22), where w is the wavelet coefficient, a is the object data in the wavelet process, and b is the wavelet reduced data.

Note that the obtained wavelet coefficient is what is approximated with a certain error as described in detail in the above-stated Tatsuya Watanabe, et al.

The coefficient approximator 28 attaches to a calculated wavelet coefficient 90 an index for distinguishing at which level and from which wavelet the wavelet coefficient 90 is obtained, and stores the wavelet coefficient 90 into the coefficient memory 42 (step S34).

Specifically, the coefficient memory 42 for wavelet is, as shown in FIG. 9, provided so as to store the wavelet coefficient 134 corresponding to a level 132. As an example of the index, the wavelet coefficient is denoted in the form of $w_{i,j}$. In this form, the subscript i represents the level, and the subscript j represents a location in the time axis direction. The larger number j represents the wavelet coefficient resultant from multiplying the newer data by the wavelet.

Also note that, when the wavelet coefficient calculated in the past is already stored in the coefficient memory 42, the process can be omitted which acquires the wavelet reduced data corresponding thereto to calculate the wavelet coefficient.

The above process can be repeated each time of arrival of the data to thereby continue the consecutive calculation of the approximate value of the wavelet coefficient with the tolerance.

Figure 2B:
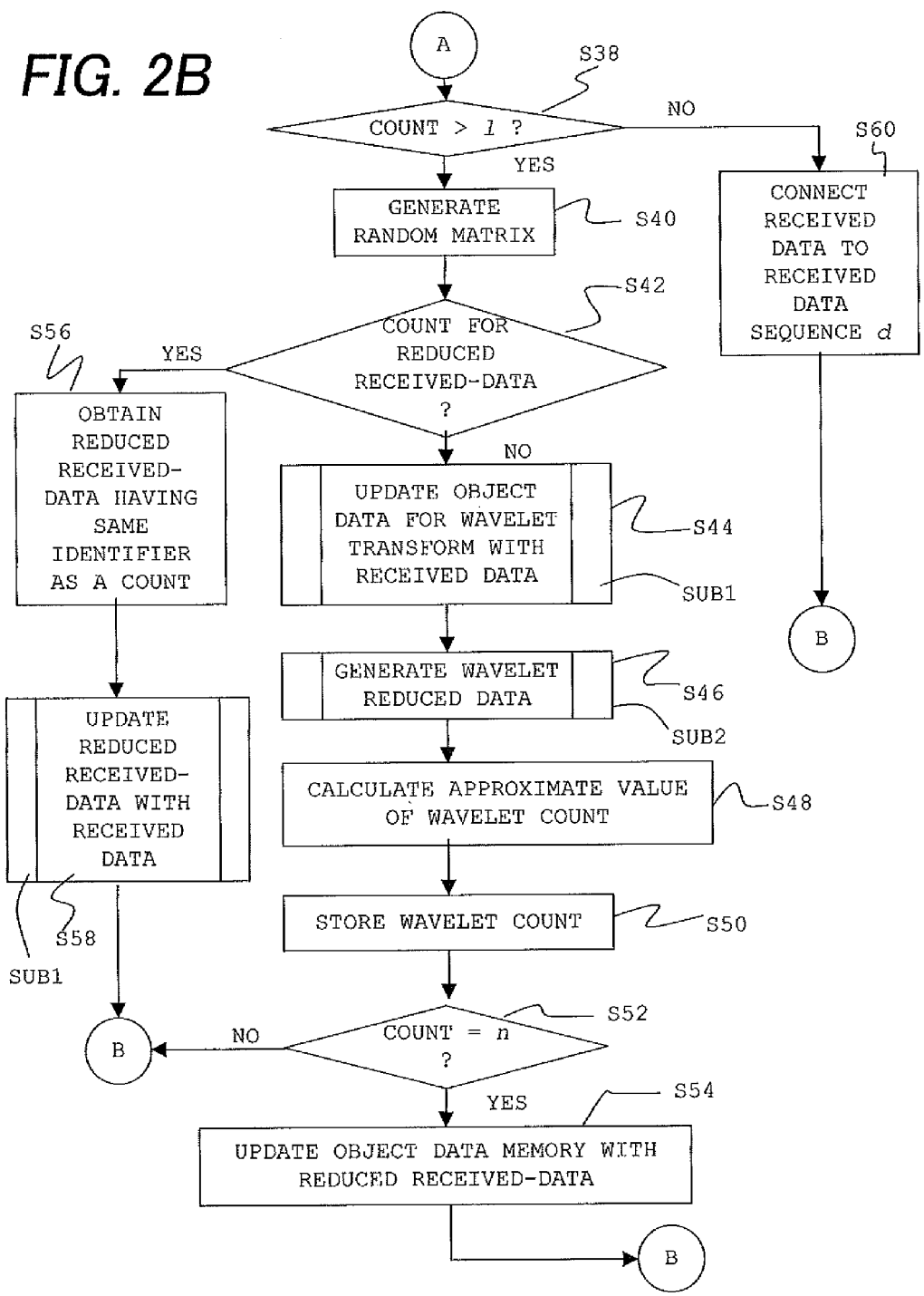

The operational control, in turn, decides whether or not the number of received data t is less than the integer n at the step S36, FIG. 2B. When the number of received data t is not less than the integer n (YES), the operational sequence progresses to the step S38 of switching of the object for the wavelet calculation. When the number of received data t is less than n (NO), the operational sequence returns to the step S10 of receiving data. The steps S20 through S34 are conducted in parallel corresponding to the number of the reduced received-data.

In the step S38 of switching the object for the wavelet calculation, the object selecting controller 30 supplies the control signal 66d fed from the location monitor 18 as the control signal to the counter 14 to cause the counter 14 to start counting in parallel, supplies the control signal 66d as the control signal 92 to the count memory 20 to cause the count memory 20 to store the number 50 of the data delivered from the counter 14, and outputs the number of data 52 read out from the count memory 20 to the location monitor 18. The location monitor 18 always monitors the number 52 of the received data.

When the object selecting controller 30 receives the control signal 66d supplied from the location monitor 18 and representing the count 52 for the objet data for wavelet transform being equal to the predetermined integer n, the controller 30 replaces the object data for wavelet transform stored in the object data memory 22 with one of the reduced received-data stored in the reduced received-data memory 24.

In the replacement procedure, the object selecting controller 30 first selects, among the one or more reduced received-data stored in the reduced received-data memory 24, data stored earliest in the memory 24. In the example shown in FIG. 8, the reduced received-data are stored in the time serial order from the top. Therefore, the reduced received-data corresponding to the reduced received data "A" will be selected since it is oldest.

This illustrative embodiment is adapted to select one of the reduced-data sequences which was stored earliest. The present invention is not restricted to this specific embodiment. Any one of the reduced-data sequences may be selected as object data in the wavelet process.

The object selecting controller 30 stores into the object data memory 22 the selected reduced received-data 68 as new object data for wavelet processing. At this time, the object selecting controller 30 locates, among the counts for use in processing the reduced received-data stored in the count memory 20 and having the same identifier as the selected, reduced received-data stored in the count memory 20 together with the reduced received-data 66, the count stored in the count memory 20 for the object data for use in old wavelet processing, and updates the latter with the located count.

Figure 10:
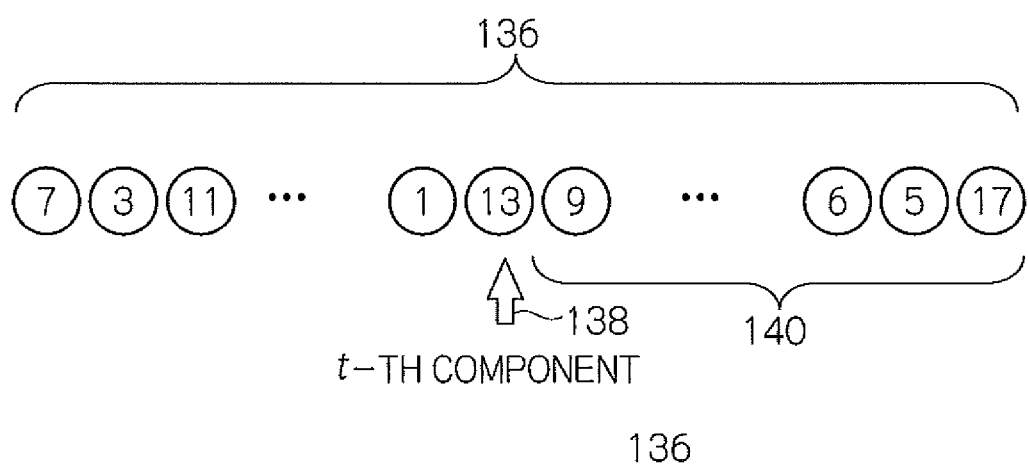
FIG. 10 shows how to switch an object in a wavelet calculation by the object selecting controller shown in FIG. 1B.

Switching of the object of wavelet calculation in accordance with this embodiment will be conceptually described with reference to FIG. 10. In the figure, object data 136 in the wavelet process are what are obtained by dimensionally reducing a received data sequence (7, 3, 11, . . . , 13, 9, . . . , 6, 5, 17) in the case of the plurality (n) of data through random projection and stored in the object data memory 22. The data 136 are a data sequence on which the wavelet coefficient is calculated. The arrow 138 indicates the location of the t-th piece of the data. Object data 140 in the wavelet process are what are generated by dimensionally reducing a data sequence (9, . . . , 6, 5, 17) starting from the (t+1)-th piece of the data through random projection and stored in the reduced received-data memory 24.

The process of switching the object is referred to as a procedure that, when the count for object data for wavelet transform reaches the value n, a reduced received-data following the oldest reduced received-data in the reduced received-data memory 24 is selected, and the object data for wavelet transform currently stored in the object data memory 22 are deleted to feed the object data memory 22 with the reduced received-data 68 selected by the reduced received-data memory 24 to thereby substitute the reduced received-data 68 thus fed as object data for calculating the approximate value of the wavelet coefficient. In this way, the object is set so as to use the replaced data sequence to continue the process for calculating the approximate value. Additionally, the object selecting controller 30 updates the count for object data for old wavelet transform stored in the count memory 20 with a new count for the object data for wavelet transform having the same identifier as the reduced received-data selected recently. The count associated with the same identifier as the selected, reduced received-data is deleted from the count memory 20 together with the identifier.

When the count for object data for wavelet transform reaches the value n, the replacement of the object data for wavelet transform causes the data sequence to be shortened, resulting in preventing the number of data of the object data for wavelet transform from exceeding the predetermined threshold value n. That makes it possible to maintain the error amount of the approximate value of the calculated wavelet coefficient within the predetermined tolerance. After this step S38, the operational sequence returns through the connector B to the step S10 of receiving data.

In summary, in this illustrative embodiment, each time the count for the object data for wavelet transform is equal to a multiple of the predetermined integer l, the reduced received-data are found, and, when the count for the object data for wavelet transform reaches the integer n, larger than the integer l, the approximate value of the wavelet coefficient is calculated as object data for wavelet processing. Therefore, even when the number of the received data exceeds the threshold value n, the approximate value of the wavelet coefficient can be found with the predetermined tolerance.

In other words, as described in Tatsuya Watanabe, et al., against the problem where the approximate value could otherwise not be calculated due to reaching the maximum number of data for guaranteeing the approximation accuracy, the approximate value arithmetic apparatus 10 is newly provided with the location monitor 18 performing the parallel calculation, such as to proceed to the random projection in parallel with the data shifted in position. Thereby, prior to the object data in a certain current wavelet process having reached the maximum number of data for guaranteeing the approximation accuracy, the object selecting controller 30 selects the reduced received-data processed with its data length shorter than the maximum number through random projection as the object data in the next wavelet process, thereby allowing the approximate calculation to be continued.

With the illustrative embodiment, all the wavelet coefficients calculated by the coefficient approximator 28 are stored in the coefficient memory 42. The present invention is not restricted to this embodiment, but may be applied to deleting the approximate value of the wavelet coefficient stored earliest so as to permit the memory to store the predetermined number of data.

Figure 11:
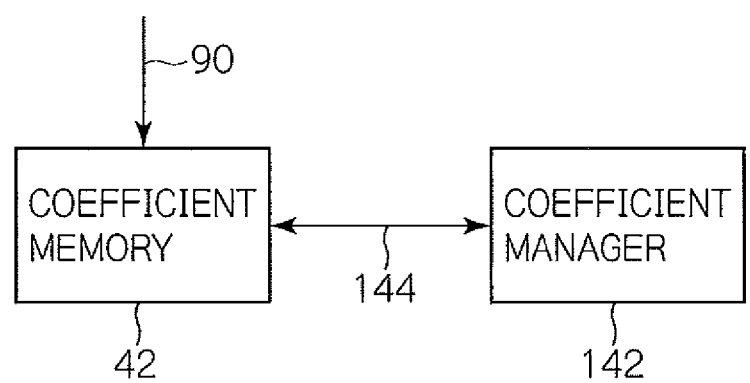
FIG. 11 shows a connection relationship of a coefficient manager and the coefficient memory provided in the approximate value arithmetic apparatus shown in FIG. 1B.

The approximate value arithmetic apparatus 10 may have, for example, a coefficient manager 142 newly provided for managing the wavelet coefficient, as shown in FIG. 11, to determine whether or not the number 144 of the approximate value of the wavelet coefficient stored in the coefficient memory 42 exceeds a predetermined number. In that case, when the determination is true, the approximate value arithmetic apparatus 10 may supply a control signal 142 for deleting the approximate value of the wavelet coefficient stored earliest so as to limit the number 144 to the predetermined value, and delete the oldest approximate value in response to the control signal.

The entire disclosure of Japanese patent application No. 2009-60029 filed on Mar. 12, 2009, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An approximation computation apparatus comprising:
   a data receiver for consecutively receiving data for calculating an approximate value of an analytical value;
   a counter for counting the received data to produce a count value of the received data;
   a count memory for storing the count value;
   a data matrix generator for dimensionally reducing a predetermined data matrix by random projection to generate and output reduced data;
   a dimensionality reducer for dimensionally reducing a received data sequence through the random projection to generate object data in a process for calculating the approximate value and outputting the object data;
   a coefficient approximator for calculating the approximate value of the analytical value on a basis of the object data in the process for calculating the approximate value and the reduced data;
   a location monitor for monitoring whether or not a data location of the received data sequence reaches a predetermined value; and
   an object selecting controller for switching and controlling a control object related to generation of the object data treated in response to monitoring by said location monitor, wherein
   said location monitor designates a starting location of the received data for use in generation of a reduced received-data by the monitoring, the reduced received-data being object data generated from the received data sequence each time the number of data of the received data sequence exceeds a predetermined first integer l,
   said dimensionality reducer generates the object data in response to receiving new data, dimensionally reduces each data sequence including the data having the starting location, for generating the reduced received-data by using the received data sequence, designated by the monitoring by said location monitor through the random projection to generate the reduced received-data, and outputs the object data and the reduced received-data, and
   said object selecting controller is responsive to the number of data of the received data reaching a second integer n larger than the first integer l, selects any one of the plurality of reduced received-data as the object data for wavelet transform to thereby control said coefficient approximator to calculate the approximate value of the analytical value.

2. The apparatus in accordance with claim 1, wherein the analytical value is a wavelet coefficient, and the data matrix is a matrix representing a wavelet at each analytical level.

3. The apparatus in accordance with claim 2, wherein the second integer n is equal to a maximum length of the data sequence for use in calculation of the approximate value of the wavelet coefficient with a predetermined tolerance.

4. An approximation computation apparatus for setting a wavelet coefficient as an analytical value to calculate an approximate value of the wavelet coefficient, comprising:
   a random matrix supplier for receiving a request to generate a random matrix, generating random numbers for an arbitrary number of groups each including a predetermined first integer number k of the random numbers, setting a predetermined first integer n to a maximum number of rows to generate the random matrix of n rows and k columns from the generated random numbers, and storing and outputting the generated random matrix;
   an output switcher for selecting at least one arbitrary row from the random matrix of n rows and k columns to switch a destination;
   a data receiver for consecutively receiving data for calculating an approximate value of the wavelet coefficient;
   a counter for counting a number of data of received data and separately counting the newly received data in parallel each time the count exceeds a predetermined second integer l;
   a count memory for storing the numbers of the data of a plurality of types of the counted data;
   a dimensionality reducer for receiving the data sequence having a length equal to or more than one and set as an object for calculating the approximate value of the wavelet coefficient and the stored random matrix to dimensionally reduce the data sequence with the random matrix through random projection, generating object data for wavelet transform with the data sequence having its number of data fixed to a second number k, and outputting the generated object data;
   an object data memory for storing the object data for wavelet transform supplied from said dimensionality reducer;
   a data matrix generator for receiving wavelet data set on a basis of a predetermined wavelet data matrix and the random matrix to dimensionally reduce the wavelet data through the random projection, generating a wavelet reduced-data sequence, and outputting the generated wavelet reduced-data sequence;
   a reduced data memory for storing the wavelet reduced-data sequence as a wavelet matrix at an associated wavelet level;
   a coefficient approximator for using the object data for wavelet transform from said object data memory and the wavelet matrix from said reduced data memory to calculate the approximate value of the wavelet coefficient;
   a coefficient memory for storing the calculated approximate value of each wavelet coefficient;

a location monitor for monitoring whether or not a data location of the received data sequence reaches a predetermined value;

a reduced received-data memory for storing the reduced data generated by said dimensionality reducer as reduced received-data; and an object selecting controller for switching and controlling a control object so as to update a treated object of the object data in response to monitoring by said location monitor, wherein said location monitor designates a starting location of the received data for use in generation of reduced received-data by the monitoring, the reduced received-data being an object data generated from the received data sequence each time the number of data counted by said counter exceeds the second integer l, said dimensionality reducer generates the object data in response to receiving new data, dimensionally reduces each data sequence including the data having the starting location, for generating the reduced received-data by using the received data sequence, designated by the monitoring by said location monitor through the random projection to generate the reduced received-data, and outputs the object data and the reduced received-data, and said object selecting controller is responsive to the number of the received data reaching the first integer n, selects the reduced received-data after the oldest reduced received-data stored in said reduced received-data memory, deletes the object data for wavelet transform currently stored in said object data memory, supplies the reduced received-data in said reduced received-data memory as new object data to said object data memory, and substitutes the object data to update.

5. The apparatus in accordance with claim 4, wherein said dimensionality reducer includes:

a data converter for converting, in calculation of the object data in response to the new data received and calculation of the reduced received-data in response to designation from said location monitor, a data format of the received data sequence from said data receiver and the random matrix from said random matrix supplier based on an inner product of a matrix;

an inner product calculator for using the received data sequence and the random matrix converted by said data converter to calculate the inner product of the matrix to perform the random projection; and;

an adder for adding column data of the received data to column data obtained through the random projection to dimensionally reduce the received data.

6. The apparatus in accordance with claim 4, further comprising a coefficient manager for managing the wavelet coefficient, wherein said coefficient memory stores the calculated approximate value of the wavelet coefficient at each level of the wavelet data matrix in an order of the approximate values calculated, and said coefficient manager is responsive to the number of the approximate values of the wavelet coefficient at each level stored in said coefficient memory exceeding a predetermined second number, deletes the approximate value of the wavelet coefficient stored earliest so as to limit the number of the approximate values to the second number.

7. The apparatus in accordance with claim 4, wherein the integers k, n, and l satisfy a relationship of $k \leq l < n$.

8. The apparatus in accordance with claim 4, wherein the first integer n is equal to a maximum length of the data sequence for use in calculation of the approximate value of the wavelet coefficient with a predetermined tolerance.

9. A method for processing an approximate calculation, comprising:

a first step of consecutively receiving by a data receiver data of which an approximate value of an analytical value is found;

a second step of counting the received data by a counter;

a third step of storing a count value of the received data into a count memory;

a fourth step of deciding by a location monitor whether or not a number of data of a data sequence coupling the received data is larger than a predetermined first integer l, and monitoring the number of data so as to monitor a start location of data for use in generation of reduced received-data;

a fifth step of resetting the count value for monitoring stored in the count memory to a predetermined value, when the number of data of the data sequence is larger than the first integer l;

a sixth step of deciding whether or not the number of data of the data sequence is equal to the first integer l by the location monitor;

a seventh step of progressing, when the number of data of the data sequence is equal to the first integer l, to first random matrix generation processing of generating a random matrix by a random matrix supplier receiving a request to generate a random matrix, generating random numbers associated with an arbitrary number of groups each including a predetermined first integer number k of random numbers, setting a predetermined second integer n as a maximum number of rows to generate the random matrix of n rows and k columns from the generated random numbers, and storing and outputting the generated random matrix;

an eighth step of progressing to a decision whether or not the number of data of the data sequence is larger than the first integer l, when the number of data of the data sequence is less than or larger than the first integer l, to decide condition;

a ninth step of using a first random matrix generated by a dimensionality reducer receiving the data sequence having a length equal to or more than one and set as an object of which the approximate value of the wavelet coefficient is to be found and the stored random matrix to dimensionally reduce the data sequence with the random matrix through the random projection, generating an object data for wavelet transform with the data sequence having its number of data fixed to the first number k, and outputting the generated object data, to dimensionally reduce a received data sequence by random projection to generate object data for wavelet transform, and to return to said first step;

a tenth step of progressing, when a decision result from said eighth step is larger than the first integer l, to second random matrix generation processing of generating the random matrix by the random matrix supplier to generate a second random matrix;

an eleventh step of coupling the received data to the received data sequence when the decision result from said eighth steps is less than the first integer l, and returning to said first step;

a twelfth step of using the second random matrix generated by a data matrix generator receiving wavelet data set on the basis of a predetermined wavelet data matrix and the random matrix and dimensionally reducing the wavelet data through the random projection to thereby generate wavelet reduced-data through the random projection and output the generated wavelet reduced-data, and dimensionally reducing the wavelet data set through the random projection on the basis of a predetermined wavelet data matrix to generate wavelet reduced-data;

a thirteenth step of dimensionally reducing each received data sequence including the data after a designated starting location through the random projection, and generating and outputting the dimensionally reduced data sequence as the object data and the reduced received-data depending on destinations by the dimensionality reducer;

a fourteenth step of using the object data for wavelet transform from the object data memory storing the object data for wavelet transform supplied from the dimensionality reducer and the wavelet matrix from the reduced data memory storing the wavelet reduced data as a wavelet matrix at an associated wavelet level, and calculating by a coefficient approximator the approximate value of the wavelet coefficient on the basis of the object data for wavelet transform and the reduced data of the wavelet matrix;

a fifteenth step of storing the calculated approximate value of each wavelet coefficient into a coefficient memory;

a sixteenth step of deciding by the location monitor whether or not the number of data in the received data sequence is equal to or larger than the second integer n;

a seventeenth step of deleting, when the number of data is equal to or larger than the second integer n, oldest reduced received-data in the reduced received-data memory storing the reduced received-data, selecting and updating the reduced received-data left in the reduced received memory as new object data for wavelet transform, by an object selecting controller switching and controlling a control object so as to update a treated object of the object data in response to the monitoring by the location monitor; and an eighteen step of returning to said first step when the number of data is larger than the first integer l but is less than the second integer n.

10. The method in accordance with claim 9, wherein the second integer n is equal to a maximum length of the data sequence for use in calculation of the approximate value of the wavelet coefficient with a predetermined tolerance.

11. The method in accordance with claim 9, wherein the random matrix is generated by generating random numbers for an arbitrary number of groups each including the first integer number k of the random numbers, and generating the random matrix of n rows and k columns from the generated random numbers with the maximum number of rows set to the second integer n.

12. The method in accordance with claim 9, said method carries out in parallel corresponding to the number of the reduced received-data in said fifth through fifteenth steps.

* * * * *